(12) United States Patent
Lunny

(10) Patent No.: US 11,592,590 B2
(45) Date of Patent: Feb. 28, 2023

(54) WELL LOG CHANNEL MATCHING

(71) Applicant: Schlumberger Technology Corporation, Sugar Land, TX (US)

(72) Inventor: Christopher Lunny, Redwood City, CA (US)

(73) Assignee: Schlumberger Technology Corproation, Sugar Land, TX (US)

( * ) Notice: Subject to any disclaimer, the term of this patent is extended or adjusted under 35 U.S.C. 154(b) by 141 days.

(21) Appl. No.: 17/247,580

(22) Filed: Dec. 17, 2020

(65) Prior Publication Data
US 2021/0199831 A1 Jul. 1, 2021

Related U.S. Application Data

(60) Provisional application No. 62/955,235, filed on Dec. 30, 2019.

(51) Int. Cl.
*G01V 1/40* (2006.01)
*G06F 16/2455* (2019.01)
*E21B 49/00* (2006.01)
*G06K 9/62* (2022.01)

(52) U.S. Cl.
CPC .......... *G01V 1/40* (2013.01); *G06F 16/24558* (2019.01); *E21B 49/00* (2013.01); *G01V 2210/62* (2013.01); *G06K 9/6215* (2013.01)

(58) Field of Classification Search
CPC ...... E21B 2200/20; E21B 47/00; E21B 49/00; G01V 1/40; G01V 1/48; G01V 2210/62; G06F 16/2455; G06F 16/24558; G06K 9/6215
See application file for complete search history.

(56) References Cited

U.S. PATENT DOCUMENTS

2009/0210707 A1* 8/2009 De Lutiis .............. H04L 63/123
  713/170
2017/0011115 A1* 1/2017 Cheung ............. G06F 16/90344

OTHER PUBLICATIONS

Leonidas J. Guibas, "The Analysis of Hashing Algorithms", Thesis 1976 Xerox Palo Alto Research Center (Year: 1976).*
Avery Li-Chun Wang, "An Industrial-Strength Audio Search Algorithm," URL: https://www.ee.columbia.edu/~dpwe/papers/Wang03-shazam.pdf (valid on Mar. 6, 2019), 7 pages.

* cited by examiner

*Primary Examiner* — Regis J Betsch
(74) *Attorney, Agent, or Firm* — Michael Guthrie

(57) ABSTRACT

A method may include calculating a first set of hash values for a set of well log channels, extracting a well log channel snippet from an unknown well log channel, calculating a second set of hash values for the well log channel snippet, identifying, for the unknown well log channel, a matching well log channel by searching the first set of hash values with the second set of hash values, and storing, for the unknown well log channel, a channel context corresponding to the matching well log channel.

18 Claims, 9 Drawing Sheets

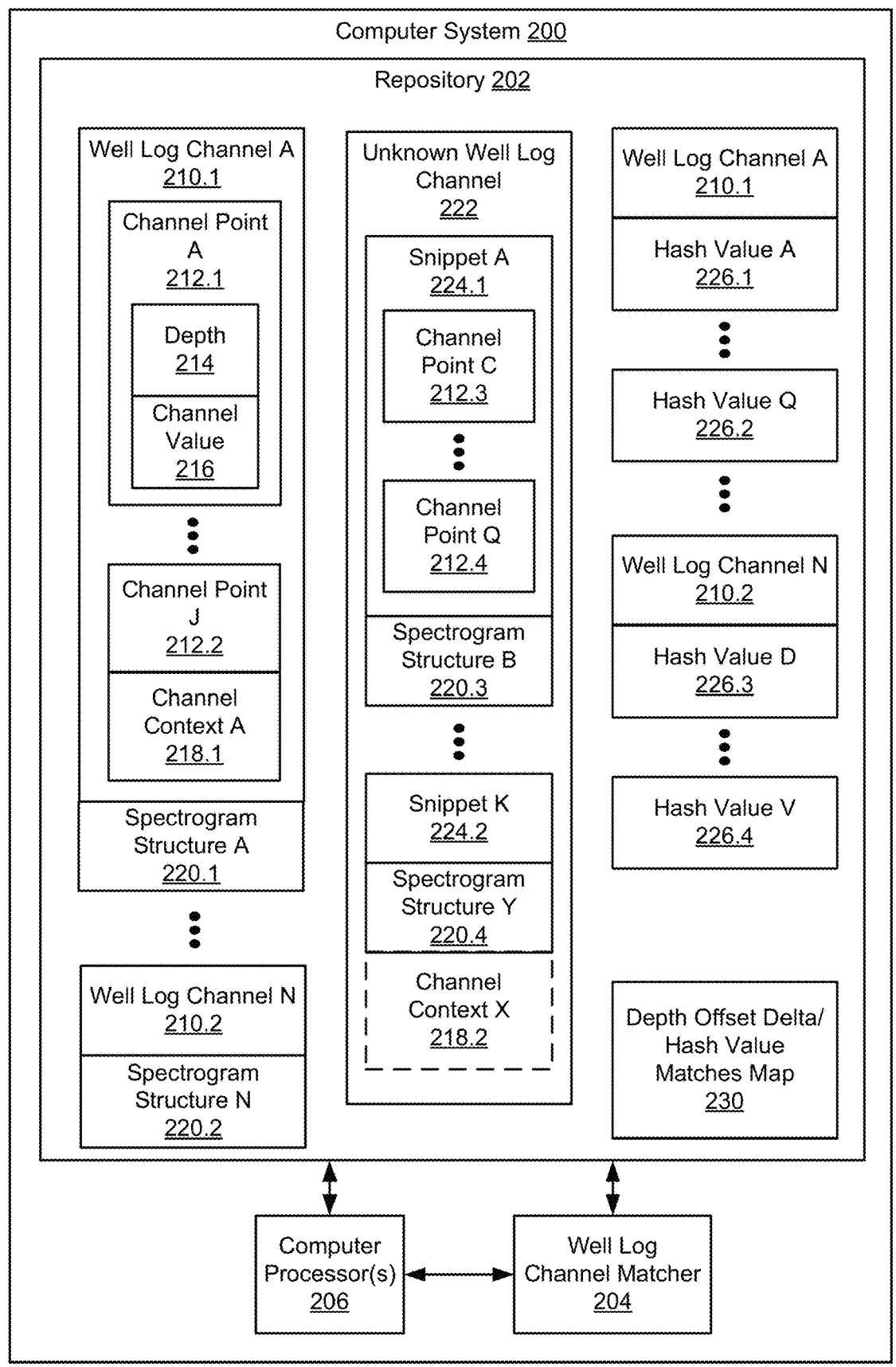
FIG. 2.1

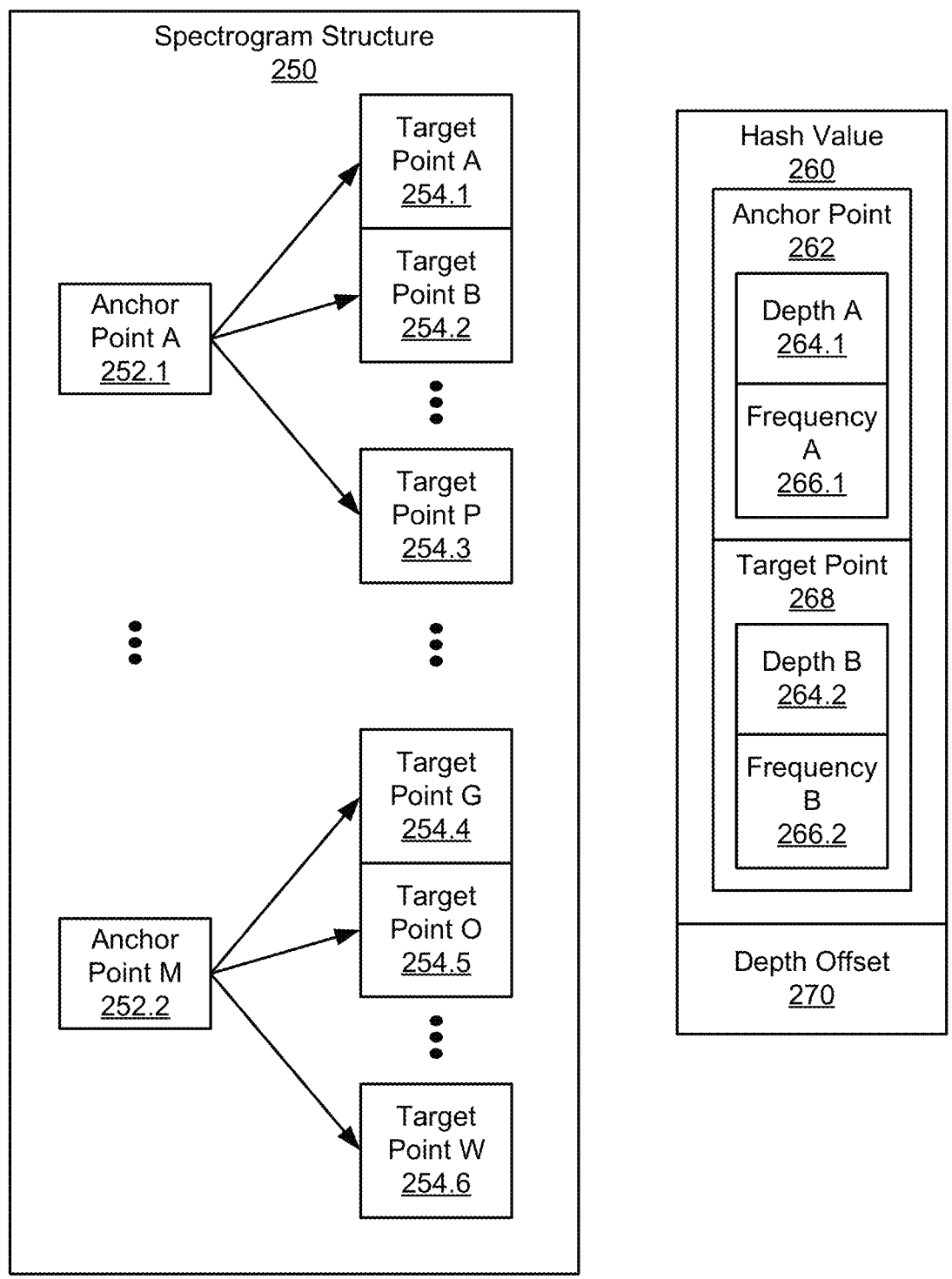
FIG. 2.2

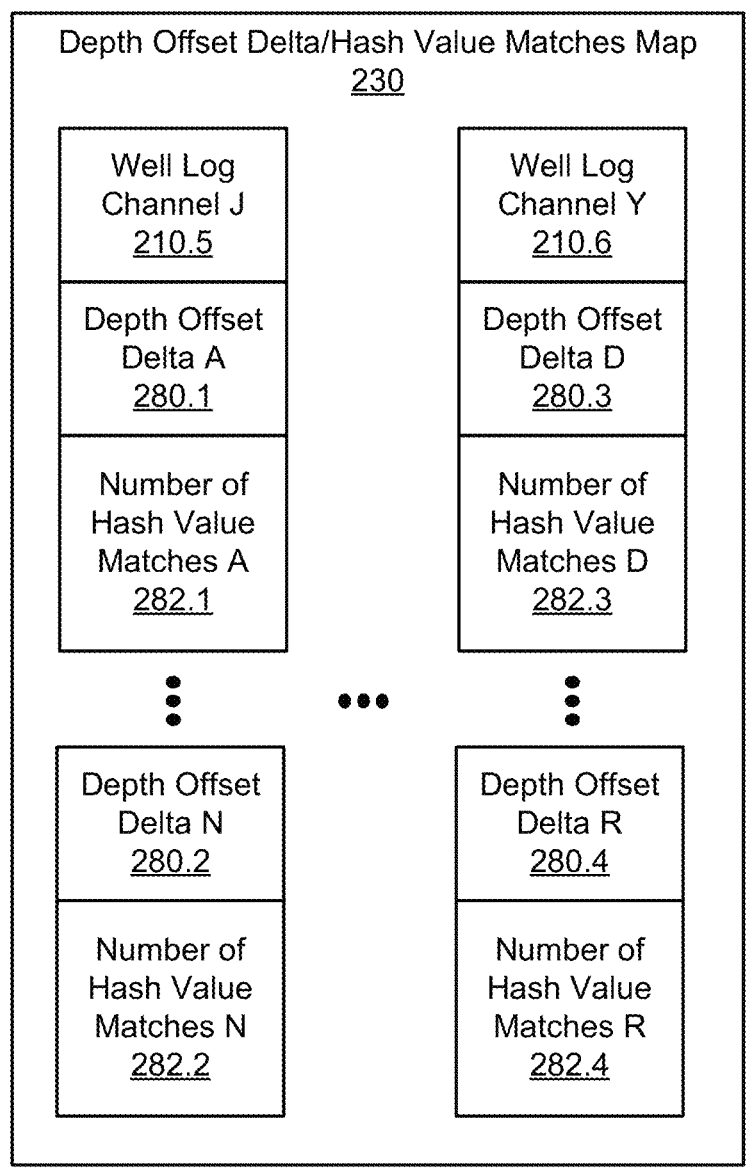
FIG. 2.3

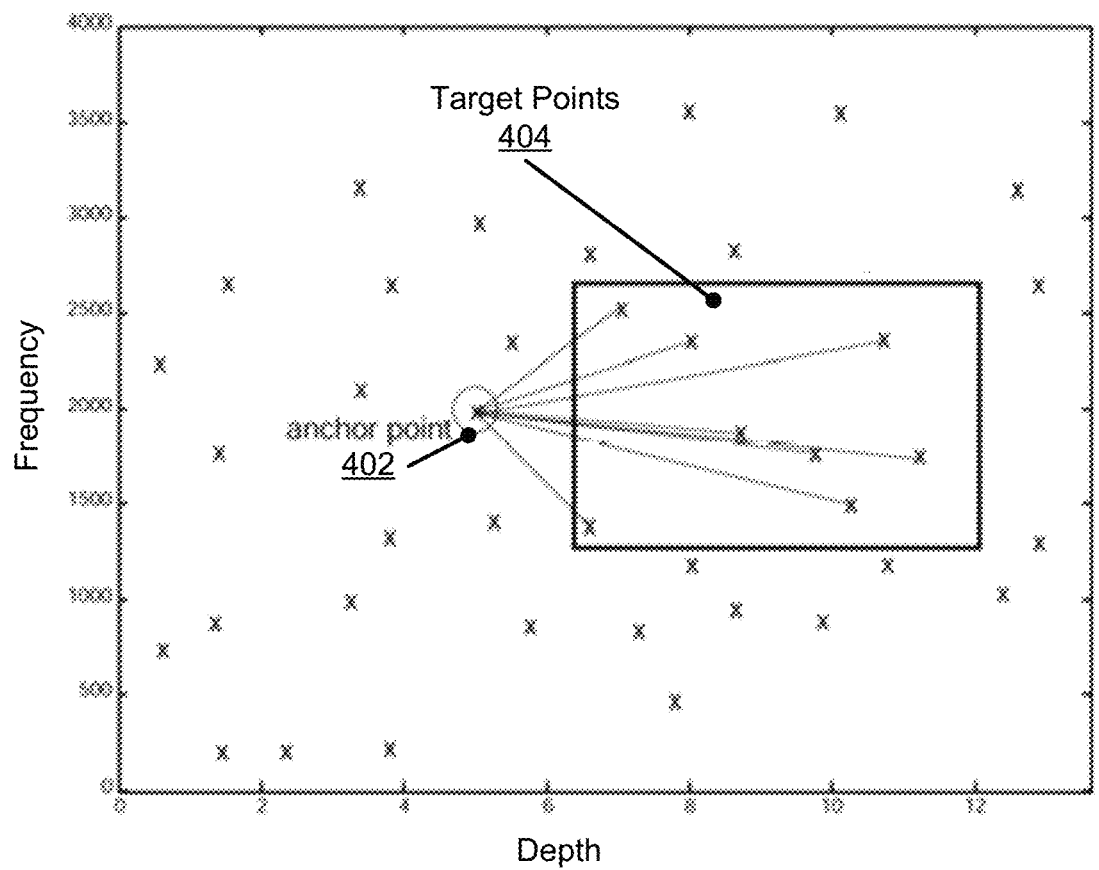
FIG. 4.1

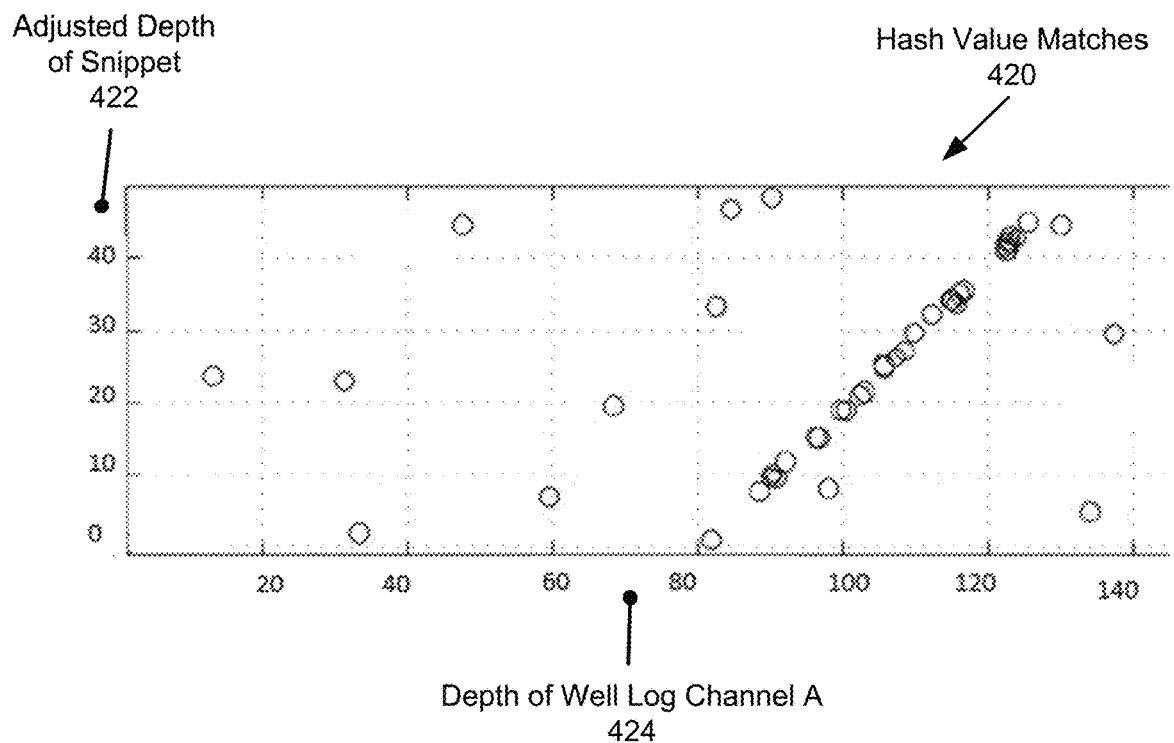
FIG. 4.2
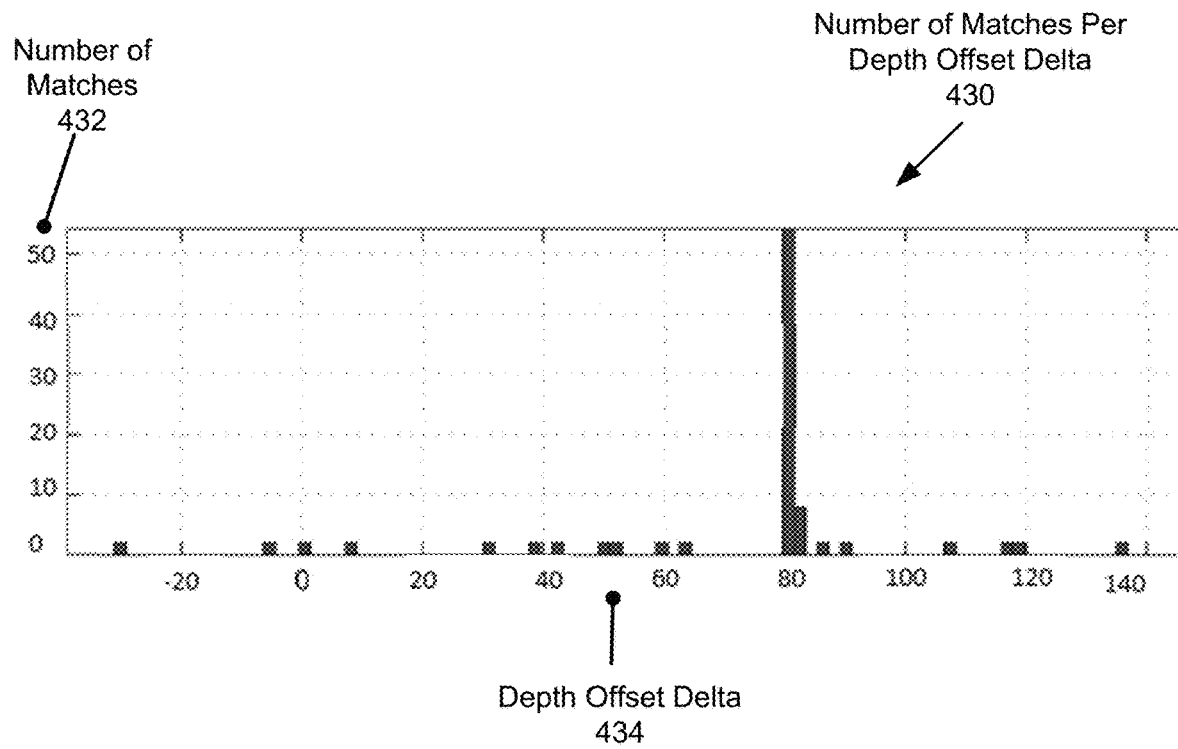
FIG. 4.3

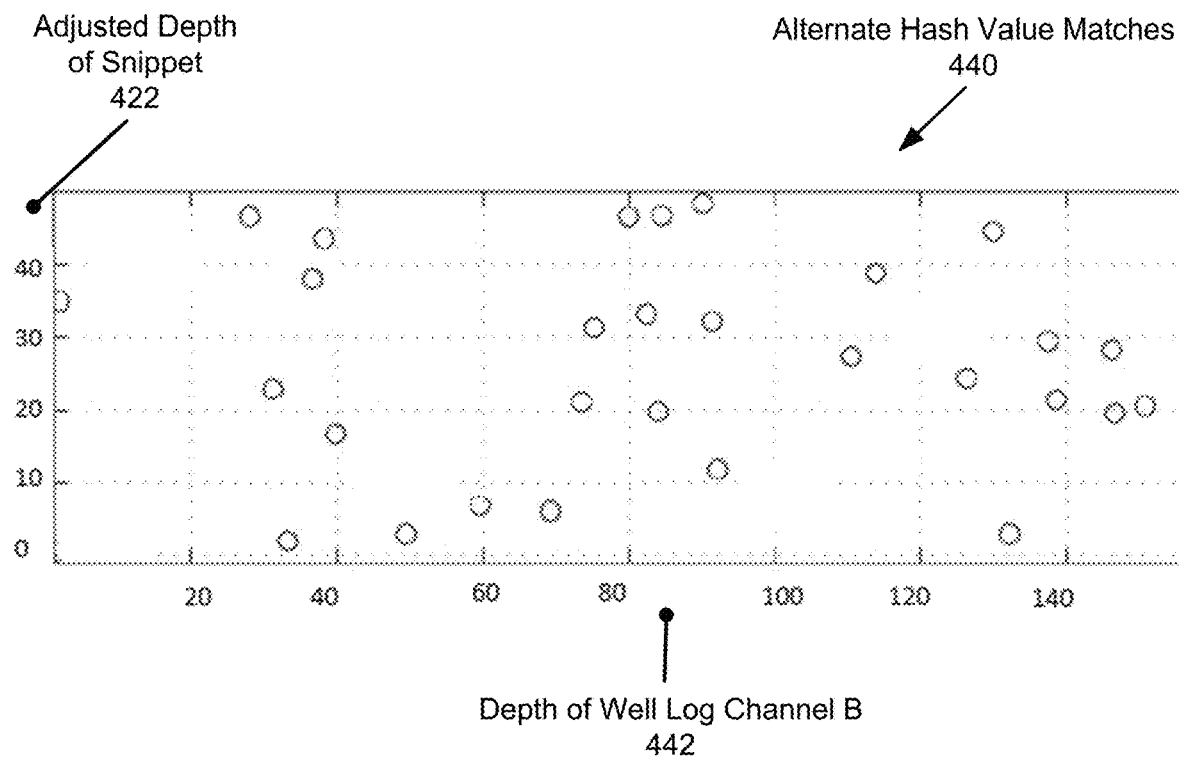
FIG. 4.4
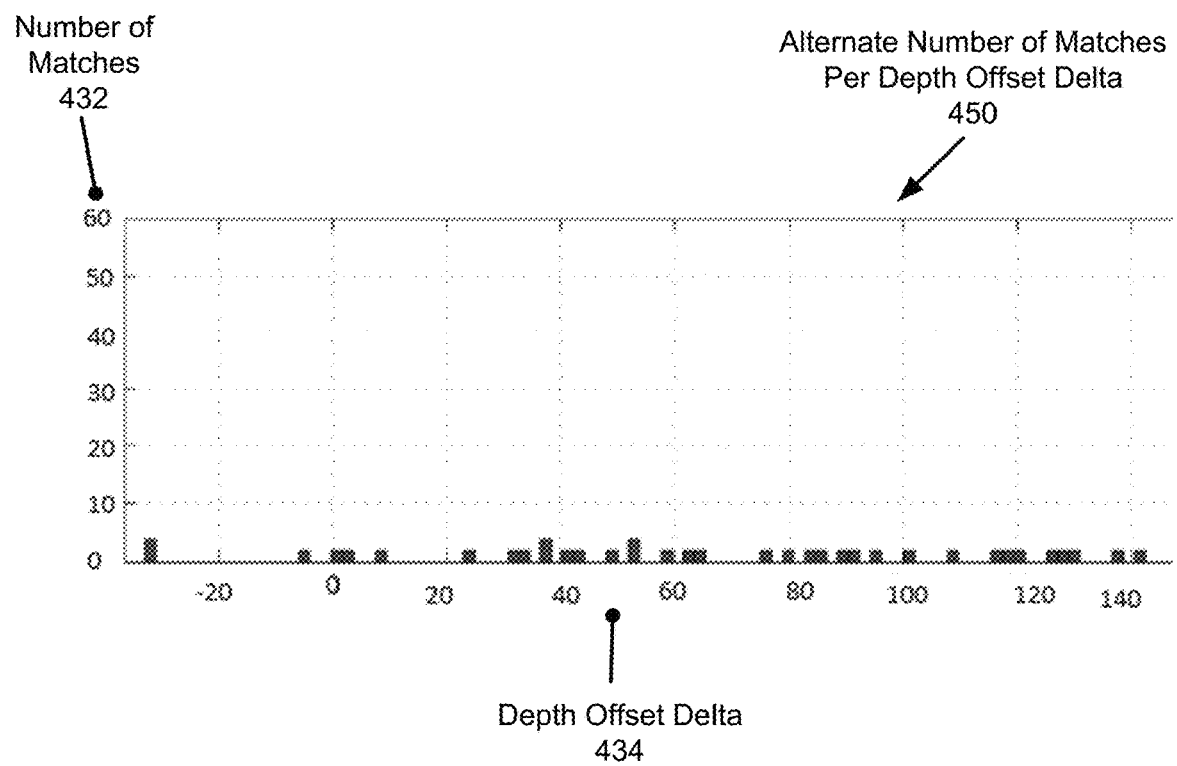
FIG. 4.5

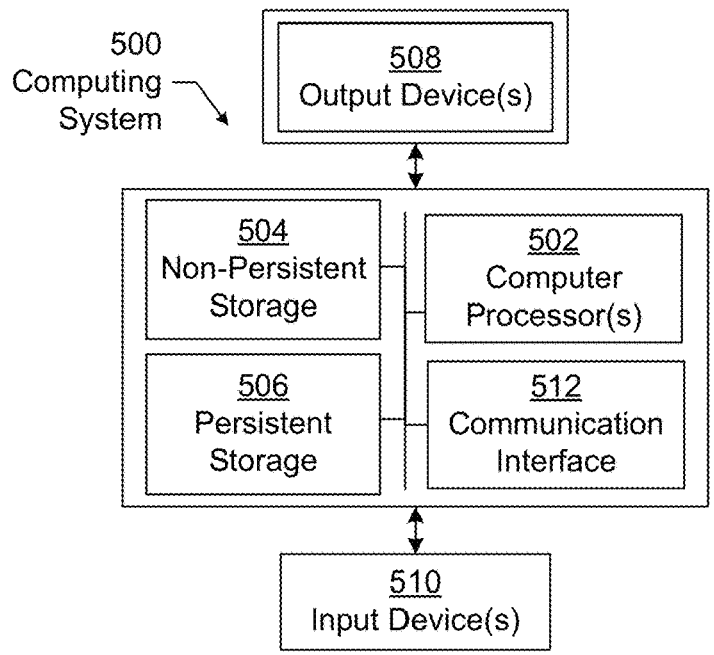
FIG. 5.1
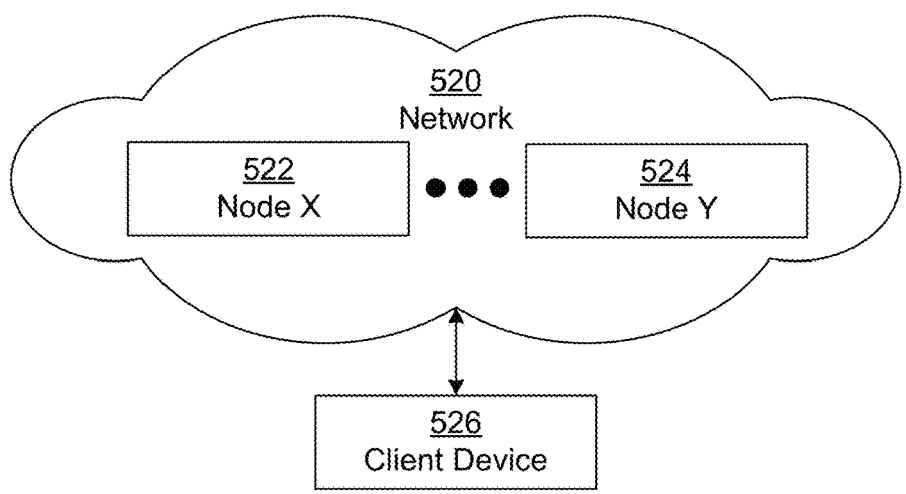
FIG. 5.2

WELL LOG CHANNEL MATCHING

This application claims the benefit of U.S. Provisional Patent Application No. 62/955,235 filed on Dec. 30, 2019 and is hereby incorporated by reference in its entirety.

BACKGROUND

A well log is a set of measurements taken along a length of the borehole. The measurements in the well log are of the physical properties of the geological formation, fluids, and other aspects of the wellbore. Well logs may include multiple channels, where a channel corresponds to a physical property. The channels includes a series of measurement values. A measurement value is for a corresponding depth of the wellbore. Because of the length of the wellbore, the number of physical properties measured, and the number of measurement values along the length, such as at periodic intervals, well logs may have large volumes of data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including calculating a first set of hash values for a set of well log channels, extracting a well log channel snippet from an unknown well log channel, calculating a second set of hash values for the well log channel snippet, identifying, for the unknown well log channel, a matching well log channel by searching the first set of hash values with the second set of hash values, and storing, for the unknown well log channel, a channel context corresponding to the matching well log channel.

Other aspects of the disclosure will be apparent from the following description and the appended claims.

BRIEF DESCRIPTION OF DRAWINGS

FIGS. 2.1, 2.2, and 2.3 show diagrams of a system in accordance with disclosed embodiments.

FIGS. 4.1, 4.2, 4.3, 4.4 and 4.5 show an example in accordance with disclosed embodiments.

FIGS. 5.1 and 5.2 show computing systems in accordance with disclosed embodiments.

DETAILED DESCRIPTION

Figure 1:
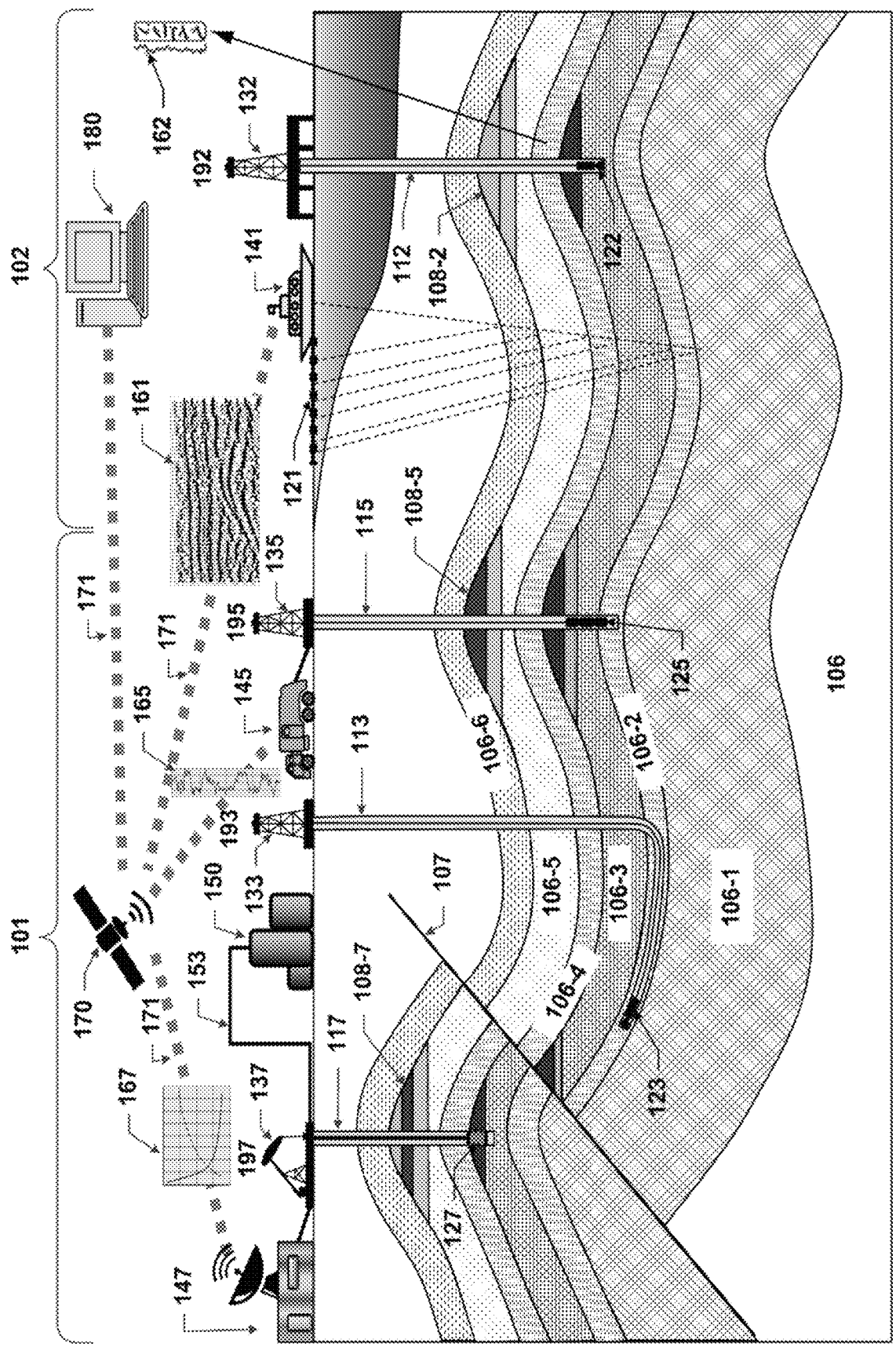
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to well log channel matching. A well log is a series of measurement values versus depth of one or more physical properties in and around a well. A well log may include multiple well log channels. A well log channel corresponds to a particular physical property of the well log. As such, a well log channel includes a series of channel points. A channel point has a measurement value (i.e., channel value) at a corresponding depth. For example, the series of channel values may be electrical values, porosity values, etc. The depth is a distance from a near-surface reference point, such as a surface unit. Depth may be measured using a unit of measurements of length and/or time.

Well log channel matching may be performed when an unknown well log channel exists. For example, an unknown well long channel may not be related to channel context, such as by not having an identifier of a wellbore, data acquisition tool, wellbore operator or other contextual information. To perform well log channel matching, a first set of hash values is calculated for a set of well log channels. The hash values may be associated with varying depth offsets relative to the well log channel. Further, a well log channel snippet is extracted from the unknown well log channel. A second set of hash values is calculated for the well log channel snippet, where the hash values are associated with a depth offset adjusted relative to the beginning of the well log channel snippet. A matching well log channel for the unknown well log channel is identified by searching the first set of hash values for matches with the second set of hash values.

For a matching pair of hash values, the depth offset delta may be calculated between the depth offsets associated with the first hash value and the second hash value. The depth offset delta is the difference in depths between the channel value corresponding to the second hash value in the unknown well log and the channel value corresponding to the first hash value. The number of hash value that match and the corresponding depth offset delta is also calculated. In one or more embodiments, when the well log channel snippet matches a portion of the well log channel, the number of matching hash values is largest when the well log channel snippet depth and the well log channel depth are offset by a specific depth offset delta. The strength of the match between the well log channel snippet and the well log channel is scored based on the peak number of hash value matches for a depth offset delta. The well log channel with the highest score is identified as the best match for the unknown well log channel. The channel context corresponding to the matching well log channel is stored for the unknown well log channel.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, which may be referred to as a well log. In one or more embodiments, the well log includes one or more well log channels (e.g., 210.1, 210.2 in FIG. 2.1). Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

In one or more embodiments, the E&P computer system (180) is implemented by an E&P services provider by deploying applications with a cloud based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 5.1 and 5.2 and described below.

FIG. 2.1 shows a computer system (200) in accordance with one or more embodiments of the disclosure. The computer system (200), which may be remote from the oilfield, stores information (e.g., well log channels (210.1, 210.2)) corresponding to well logs as defined above. It is possible that a well log channel (210.1) may lose its connection to its corresponding metadata (e.g., channel context (218.1)), for example, causing the well log channel to become an unknown well log channel (222). The use of computer system (200) is not limited to the domain of oilfield operations (e.g., as described in FIG. 1) or any other domain of application.

As shown in FIG. 2.1, the computer system (200) includes a repository (202), a well log channel matcher (204), and computer processor(s) (206). The computer system (200) may correspond to the computing system (500) described with respect to FIG. 5.1 and the accompanying description below or take the form of the client device (526) described with respect to FIG. 5.2. The computer processor(s) (206) takes the form of the computer processor(s) (502) described with respect to FIG. 5.1 and the accompanying description below. The computer processor (206) includes functionality to execute the well log channel matcher (204).

In one or more embodiments of the disclosure, the repository (202) includes any type of storage unit and/or device (e.g., a file system, database, collection of tables, or any other storage mechanism) for storing data. Further, the repository (202) includes multiple different storage units and/or devices. The multiple different storage units and/or devices may or may not be of the same type or located at the same physical site.

The repository (202) stores well logs as defined above. The well logs include one or more well log channels (210.1, 210.2), an unknown well log channel (220), hash values (226.1, 226.2, 226.3, 226.4), and depth offset delta/hash value matches map (230). In one or more embodiments, a well log channel (210.1) is a portion of a well log that has a specific type of physical property value, called a channel value. For example, the channel value may be an electrical (e.g., resistivity) value, a porosity (e.g., density) value, a lithology value, a nuclear magnetic resonance (e.g., gamma ray) value, an acoustic value, a pressure value, a corrosion value, or the value of other properties of rocks and/or their contained fluids. In one or more embodiments, a well log channel (210.1) includes a series of channel points (212.1, 212.2). A channel point has a channel value (216) at a defined depth (214). The depth (214) is a distance of a wellbore (e.g., 112, 113, 115, or 117) from a near-surface reference point, such as a surface unit (e.g., 141, 145, or 147). The depth (214) may be normalized relative to a standard unit of depth (e.g., millimeters). The series of channel points (212.1, 212.2) may be plotted as a graph where one axis corresponds to the depth (214) and the other axis corresponds to the channel value (216).

The well log channel (210.1) includes a channel context (218.1) that includes information (e.g., metadata) about the well log channel (210.1). The channel context (218.1) is the context of acquiring the well log channel. In other words, the channel context includes metadata describing the set of circumstances about when the well log is obtained. For example, the channel context (218.1) may include one or more of the following: an identifier of a wellbore (e.g., 112, 113, 115, or 117), an identifier of a data acquisition tool (e.g., 121, 123, 125, or 127), an identifier of the well log that includes the well log channel (210.1), the name of the wellbore operator, a timestamp, etc. Well log channels (210.1, 210.2) may be considered to be "known" well log channels since well log channels (210.1, 210.2) are associated with their corresponding channel context (218.1). In one or more embodiments, the channel context (218.1) is stored separately from the well log channel (210.1), such that the well log channel (210.1) includes a link (e.g., a pointer) to the channel context (218.1).

A well log channel (210.1, 210.2) is associated with a spectrogram structure (220.1, 220.2). A spectrogram is a visual representation of the spectrum of frequency components of the channel corresponding to the channel points (212.1, 212.2) of a well log channel (210.1). A spectrogram structure (220.1) is a data structure that represents a spectrogram. In other words, the spectrogram structure (220.1) is the storage data structure that stores the spectrogram. The spectrogram may be generated by a Fast Fourier Transform (FFT) that transforms a channel into its frequency components. The spectrogram may be represented as a graph with two geometric dimensions, where one axis represents depth, and the other axis represents frequency. A third dimension may indicate the amplitude of a particular frequency at a particular depth. For example, the amplitude may be represented by the intensity or color of a point in the spectrogram.

As shown in FIG. 2.2, a spectrogram structure (250) includes anchor points (252.1, 252.2) and target points (254.1, 254.2, 254.3, 254.4, 254.5, 254.6). The anchor points (252.1, 252.2) and target points (254.1, 254.2, 254.3, 254.4, 254.5, 254.6) may correspond to points in the depth/frequency coordinate space of a spectrogram. An anchor point (252.1) is a point in the spectrogram structure (250) that is used in the calculation of multiple hash values (260), as discussed below. In contrast, a target point (254.1) is a point in the spectrogram structure (250) that is used in the calculation of a single hash value (260). In one or more embodiments, an anchor point (252.1) corresponds to a peak in the spectrogram represented by the spectrogram structure (250). For example, an anchor point (252.1) may be a point in the spectrogram structure (250) that corresponds to an amplitude peak in the corresponding spectrogram. As another example, an anchor point (252.1) may be a point in the spectrogram structure (250) that corresponds to a spectrogram point with higher energy than nearby points. Continuing this example, the anchor point (252.1) may correspond to a spectrogram point with a consistent density across the depth/frequency coordinate space of the spectrogram.

An anchor point (252.1) is paired with multiple target points (254.1, 254.2, 254.3). For example, the target points (254.1, 254.2, 254.3) may be within a target zone associated with the anchor point (252.1). Continuing this example, the target zone is a region in a coordinate space whose x-axis is depth and whose y-axis is frequency, such that the anchor point (252.1) is within a distance threshold of the region. For example, the distance measure may be a Euclidean distance relative to the depth/frequency coordinate space of the spectrogram structure (250).

Returning to FIG. 2.1, hash values (e.g., (226.1, 226.2), (226.3, 226.4)) are associated with well log channels (210.1, 210.2). In addition, hash values (not shown) are associated with snippets (224.1, 224.2) of the unknown well log channel (220). Returning to FIG. 2.2, a hash value (260) is generated from an anchor point (262) and a target point (268) using a hash function. For example, the hash function may convert inputs of arbitrary size into a fixed-length binary sequence. The anchor point (262) includes a depth (264.1) and a frequency (266.1). For example, the anchor point (262) represents a coordinate in the depth/frequency coordinate space of the spectrogram structure (250) Similarly, the target point (268) includes a depth (264.2) and a frequency (266.2). The hash value (260) is associated with a depth offset (270). The depth offset (226.1) may be the depth of the anchor point (262) used to generate the hash value (260).

Returning to FIG. 2.1, the unknown well log channel (220) is divided into snippets (224.1, 224.2). A snippet includes a portion of the unknown well log channel (220). That is, the snippet (224.1) includes a subset of the series of channel points (212.3, 212.4) of the unknown well log channel (220). The depth of a channel point (212.3) of the unknown well log channel (220) may be an adjusted depth relative to the beginning of the snippet (224.1). For example, the depth of a channel point (212.3) of the unknown well log channel (220) may be reduced by the depth of the first channel point in the snippet (224.1).

The snippet (224.1, 224.2) is associated with a spectrogram structure (220.3, 220.4). Unlike well log channels (210.1, 210.2), the unknown well log channel (220) may be missing its corresponding channel context (218.2), which is shown with dashed lines in FIG. 2.1. For example, the channel context (218.2) may have been stored separately from the unknown well log channel (220), and the linkage between the channel context (218.2) and the unknown well log channel (220) may have been lost.

The depth offset delta/hash value matches map (230) is a data structure that indicates the relationship between the number of hash value matches and the depth offsets (270) corresponding to the matching hash values. Turning to FIG. 2.3, the depth offset delta/hash value matches map (230) relates, for well log channels (210.5, 210.6), a depth offset delta (e.g., (280.1, 280.2), (280.3, 280.4)) to a number of hash value matches (e.g., (282.1, 282.2), (282.3, 282.4)). A depth offset delta (280.1) is the difference between the depth offsets (270) associated with a pair of matching hash values (260), as discussed further in the description of Block 308 of FIG. 3 below. For example, one hash value in the pair corresponds to a well log channel (210.1) and the other hash value in the pair corresponds to a snippet (224.1) of an unknown well log channel (222).

In one or more embodiments, the well log channel matcher (204) is implemented in hardware (e.g., circuitry), software, firmware, and/or any combination thereof. The well log channel matcher (204) includes functionality to calculate hash values (260) for well log channels (210.1, 210.2) and snippets (224.1, 224.2) of an unknown well log channel (220). The well log channel (204) includes functionality to extract a snippet (224.1) from an unknown well log channel (220). The well log channel matcher (204) includes functionality to identify a matching well log channel (210.1) for a snippet (224.1) of an unknown well log channel (220).

While FIG. 2.1, FIG. 2.2, and FIG. 2.3 show configurations of components, other configurations may be used without departing from the scope of the disclosure. For example, various components may be combined to create a single component. As another example, the functionality performed by a single component may be performed by two or more components.

Figure 3:
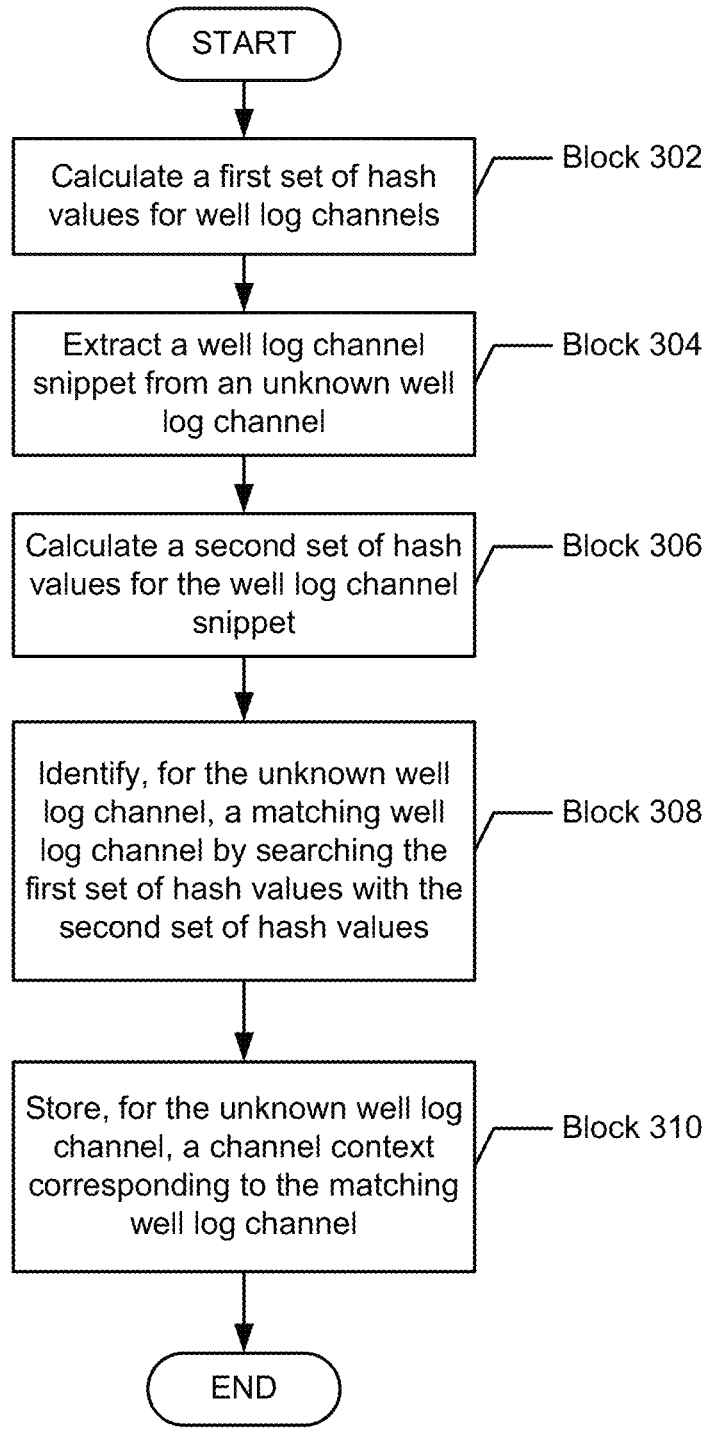
FIG. 3 shows a flowchart in accordance with disclosed embodiments.

FIG. 3 shows a flowchart in accordance with one or more embodiments of the disclosure. The flowchart depicts a process for well log channel matching. One or more of the blocks in FIG. 3 may be performed by the components (e.g., the well log channel matcher (204)) of the computer system (200)) discussed above in reference to FIG. 2.1. In one or more embodiments, one or more of the blocks shown in FIG. 3 may be omitted, repeated, and/or performed in parallel, or in a different order than the order shown in FIG. 3. Accordingly, the scope of the disclosure should not be considered limited to the specific arrangement of blocks shown in FIG. 3.

Initially, in Block 302, a first set of hash values for well log channels are calculated. The well log channels may be obtained from a repository. The well log channel may correspond to a subset of the first set of hash values. The well log channel matcher generates a spectrogram structure from one or more well log channels. For example, the well log channel matcher may generate the spectrogram structure from the channel points of the well log channel using a spectrogram generated by a Fast Fourier Transform (FFT) algorithm. The well log channel matcher selects anchor points from the spectrogram structure. The well log channel matcher then selects from the spectrogram structure, for an anchor point, one or more target points that are within a target zone associated with the anchor point. The well log channel matcher then pairs the target point with the anchor point and calculates a hash value for the pair. In one or more embodiments, the hash value is based on the frequency of the anchor point, the frequency of the target point, and the difference between the depth of the anchor point and the depth of the target point.

The well log channel matcher associates the hash value with the well log channel and a depth offset relative to the well log channel. The depth offset may be the depth of the anchor point that was used to generate the hash value.

In Block 304, a well log channel snippet from an unknown well log channel is extracted. The unknown well log channel may be obtained from the repository. The well log channel snippet is any contiguous series of channel points of the unknown well log channel.

In Block 306, a second set of hash values for the well log channel snippet are calculated. The well log channel matcher generates a spectrogram structure from the well log channel snippet, selects anchor points and target points from the spectrogram structure, and calculates a hash value for the anchor/target point pair (see description of Block 302 above). The well log channel matcher associates the hash value with the well log channel snippet and a depth offset relative to the well log channel snippet.

In Block 308, a matching well log channel for the unknown well log channel is identified by searching the first set of hash values with the second set of hash values. In one or more embodiments, the well log channel matcher identifies matching pairs of hash values such that a first hash value in the pair is in the first set of hash values and a second hash value in the pair is in the second set of hash values. That is, the first hash value in the pair corresponds to a known well log channel, and the second hash value in the pair corresponds to the well log channel snippet. Next, the well log channel matcher calculates the depth offset delta between the depth offsets associated with the first hash value and the second hash value in a matching pair of hash values. Then, the well log channel matcher calculates the number of hash value matches corresponding to the depth offset delta. The number of hash value matches corresponding to the depth offset delta may be stored in a depth offset delta/hash value matches map.

In one or more embodiments, when the well log channel snippet matches the well log channel, the number of matching hash values is largest when the depth of the well log channel snippet and the depth of the well log channel depth are offset by a specific depth offset delta. For example, FIG. 4.2 illustrates this concept in a graph of the hash value matches corresponding to the depth of the well log channel snippet and the depth of the well log channel. In FIG. 4.2, the hash value matches occur along a diagonal as the depths associated with the well log channel snippet and the well log channel linearly increase. The points along the diagonal correspond to a specific depth offset delta between the depth of the well log channel snippet and the depth of the known well log channel. In FIG. 4.2, the specific depth offset delta is 80. FIG. 4.3 shows a histogram of the number of hash value matches corresponding to the depth offset delta. FIG. 4.3 shows that the number of hash value matches is greatest when the depth offset delta is 80, while the number of hash value matches is negligible at depth offset deltas other than 80.

The well log channel matcher scores the match between the well log channel snippet and the well log channel based on the peak number of hash value matches for a specific depth offset delta. The well log channel matcher may efficiently identify the peak number of hash value matches by sorting the set of depth offset deltas and scanning for a cluster of matching values. The well log channel matcher may identify multiple well log channels as candidate matching well log channels for the well log channel snippet. The well log channel matcher may identify the candidate well log channel with the highest score as the best match for the well log channel snippet. The well log channel matcher may scan for candidate well log channels until a peak number of hash value matches for a specific depth offset delta corresponding to a candidate matching well log channel exceeds a threshold level.

In Block 310, a channel context corresponding to the matching well log channel is stored for the unknown well log channel. In one or more embodiments, the well log channel matcher obtains the channel context corresponding to the matching well log channel from a repository. It may be useful to provide a capability for matching well log channel data against a database of well log channel data extracted from known well logs. For example, it may be useful to provide a service that identifies a context corresponding to a set of well log channel data. In addition, it may be useful to provide an entity resolution service that checks whether two or more sets of well log channel data correspond to the same well log channel. For example, one set of well log channel data may be a copy of an original set of well log channel data that has been adjusted for tool calibration, processed to remove noise and artifacts (e.g., spikes), shifted for depth matching, or transformed in some other fashion.

FIG. 4.1, FIG. 4.2, FIG. 4.3, FIG. 4.4, and FIG. 4.5 show an implementation example(s) in accordance with one or more embodiments. The implementation example(s) are for explanatory purposes only and not intended to limit the scope of the disclosure. One skilled in the art will appreciate that implementation of embodiments of the disclosure may take various forms and still be within the scope of the disclosure.

Initially, the well log channel matcher builds a repository of hash values corresponding to known well log channels that measure the resistivity of rocks at the measured depth. First, the well log channel matcher generates a spectrogram structure from the well log channel using a spectrogram generated by a Fast Fourier Transform (FFT) algorithm Next, the well log channel matcher selects anchor points in the spectrogram structure that correspond to amplitude peaks. The well log channel matcher then selects a threshold maximum of target points within a rectangular target zone near the anchor point. By way of an example, the threshold maximum may be 10. FIG. 4.1 shows an anchor point (402) ((252.1, 252.2) in FIG. 2.2) and its corresponding target points (404) ((254.1, 254.2, 254.3, 254.4, 254.5, 254.6) in FIG. 2.2) in a spectrogram structure (400) ((220.1, 220.2) in FIGS. 2.1 and 250 in FIG. 2.2). The well log channel matcher then pairs the target points with the anchor point and calculates a hash value for the anchor/target point pair based on the frequency of the anchor point, the frequency of the target point, and the difference between the depth of the anchor point and the depth of the target point. Next, the well log channel matcher associates the hash value with the well log channel and the depth of the anchor point.

The well log channel matcher then obtains a unknown well log channel that measures the resistivity of rocks at the measured depth and attempts to match the unknown well log channel to a known well log channel using the repository of hash values corresponding to known well log channels. The well log channel matcher extracts a snippet from the unknown well log channel. The snippet has a starting depth of 20 meters relative to the starting point (e.g., the near-surface reference point) of the unknown well log channel. The well log channel matcher generates a spectrogram structure from the snippet using a spectrogram generated by the FFT algorithm Next, the well log channel matcher selects anchor points and target points from the spectrogram structure, and calculates a hash value for the anchor/target point pair. The well log channel matcher associates the hash value with the snippet and the depth of the anchor point reduced by 20 meters, to adjust for the starting depth of the snippet.

The well log channel matcher then searches for matches between the hash values in the snippet and the hash values of the various known well log channels. The well log channel matcher identifies matching pairs of hash values such that a first hash value in the pair corresponds to a known well log channel and a second hash value in the pair corresponds to the snippet. FIG. 4.2 shows a graph of hash value matches (420), indicated by circles, corresponding to the adjusted depth of the snippet (422) and the depth of well log channel A (424). The diagonal pattern of hash value matches is indicative of a match between well log channel A and the snippet, where the strength of the match is based on the number of matching points along the diagonal. The strength of the match is evident in FIG. 4.3, which shows a histogram of the number of matches per depth offset delta (430) that shows the number of matches (432) corresponding to the depth offset delta (434). The peak number of matches, 52, occurs at a depth offset delta of 80. The well log channel matcher then assigns a score of 52 to well log channel A, equal to the peak number of matches in the histogram.

In contrast, FIG. 4.4 shows a graph of alternate hash value matches (440) corresponding to the adjusted depth of the snippet (422) and the depth of well log channel B (442). The lack of a diagonal pattern of hash value matches is indicative of a poor match between well log channel B and the snippet. The weakness of the match is evident in FIG. 4.5, which shows a histogram of an alternate number of matches per depth offset delta (450) that shows the number of matches (432) corresponding to the depth offset delta (434), where the peak number of matches is negligible.

Since no other well log channel has a higher score than well log channel A, the well log channel matcher determines that well log channel A represents the best match for the snippet. The well log channel matcher then stores the channel context of well log channel A with the unknown well log channel. In this case, the channel context includes an identifier of the wellbore used in well log channel A, an identifier of a data acquisition tool, and the name of the wellbore operator.

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical disk such as a compact disk (CD) drive or digital versatile disk (DVD) drive, a flash memory, etc.), a communication interface (522) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). A node may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where a portion of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
 a non-transitory computer readable storage medium storing a set of well log channels and a set of contexts linked to the set of well log channels, wherein the set of well log channels further comprises an unknown well log channel for which a link to a corresponding context is missing;
 calculating a first set of hash values for the set of well log channels, wherein calculating comprises:
  transforming the set of well log channels into a spectrogram structure stored in the non-transitory computer readable storage medium, wherein the spectrogram structure comprises an anchor point paired with a plurality of target points, and
  generating the first set of hash values using the anchor point and the plurality of target points;
 extracting a well log channel snippet from the unknown well log channel;
 calculating, using a second anchor point and a second plurality of target points of the unknown well log channel within the snippet, a second set of hash values;
 identifying, for the unknown well log channel, a matching well log channel by searching the first set of hash values with the second set of hash values; and
 storing in the non-transitory computer readable storage medium, for the unknown well log channel, a channel context corresponding to the matching well log channel as the corresponding context.

2. The method of claim 1,
 wherein the anchor point comprises an anchor depth and an anchor frequency,
 wherein the set of target points comprises a target point comprising a target depth and a target frequency, and
 wherein a subset of the first set of hash values is calculated using the anchor frequency of the anchor point in a respective anchor/target pair, the target frequency of the target point in the respective anchor/target pair, and the difference between the anchor depth of the anchor point in the respective anchor/target pair and the target depth of the target point in the respective anchor/target pair.

3. The method of claim 1, further comprising:
pairing the anchor point with the plurality of target points to obtain a set of anchor/target pairs,
wherein a subset of the second set of hash values is calculated using the set of anchor/target pairs.

4. The method of claim 1, further comprising:
associating, with the first set of hash values, a first set of depth offsets relative to the set of well log channels; and
associating, with the second set of hash values, a second set of depth offsets relative to the well log channel snippet.

5. The method of claim 4, wherein searching the first set of hash values using the second set of hash values comprises:
identifying a set of hash value matches comprising a hash value of the first set of hash values and a hash value of the second set of hash values;
calculating, for the set of well log channels, a set of depth offset deltas using the depth offsets associated with the hash values in the respective hash value match of the set of hash value matches; and
calculating a number of hash value matches for the respective depth offset delta of the set of depth offset deltas.

6. The method of claim 5, wherein identifying the matching well log channel comprises:
scoring the set of well log channels using the number of hash value matches for the set of depth offset deltas.

7. A system, comprising:
a memory coupled to a computer processor;
a repository configured to store a set of well log channels and a set of contexts linked to the set of well log channels, wherein the set of well log channels further comprises an unknown well log channel for which a link to a corresponding context is missing; and
a well log channel matcher, executing on the computer processor and using the memory, configured to:
calculate a first set of hash values for the set of well log channels, wherein the well log channel matcher calculates by being configured to:
transform the set of well log channels into a spectrogram structure stored in the non-transitory computer readable storage medium, wherein the spectrogram structure comprises an anchor point paired with a plurality of target points, and
generate the first set of hash values using the anchor point and the plurality of target points;
extract a well log channel snippet from the unknown well log channel;
calculate, using a second anchor point and a second plurality of target points of the unknown well log channel within the snippet, a second set of hash values;
identify, for the unknown well log channel, a matching well log channel by searching the first set of hash values with the second set of hash values; and
store in the non-transitory computer readable storage medium, for the unknown well log channel, a channel context corresponding to the matching well log channel as the corresponding context.

8. The system of claim 7,
wherein the anchor point comprises an anchor depth and an anchor frequency,
wherein the set of target points comprises a target point comprising a target depth and a target frequency, and
wherein a subset of the first set of hash values is calculated using the anchor frequency of the anchor point in a respective anchor/target pair, the target frequency of the target point in the respective anchor/target pair, and the difference between the anchor depth of the anchor point in the respective anchor/target pair and the target depth of the target point in the respective anchor/target pair.

9. The system of claim 7, wherein the well log channel matcher is further configured to:
pair the anchor point with the plurality of target points to obtain a set of anchor/target pairs,
wherein a subset of the second set of hash values is calculated using the set of anchor/target pairs.

10. The system of claim 7, wherein the well log channel matcher is further configured to:
associating, with the first set of hash values, a first set of depth offsets relative to the set of well log channels; and
associate, with the second set of hash values, a second set of depth offsets relative to the well log channel snippet.

11. The system of claim 10, wherein the well log channel matcher is further configured to search the first set of hash values using the second set of hash values by:
identifying a set of hash value matches comprising a hash value of the first set of hash values and a hash value of the second set of hash values,
calculating, for the set of well log channels, a set of depth offset deltas using the depth offsets associated with the hash values in the respective hash value match of the set of hash value matches, and
calculating a number of hash value matches for the respective depth offset delta of the set of depth offset deltas.

12. The system of claim 11, wherein the well log channel matcher is further configured to identify the matching well log channel by:
scoring the set of well log channels using the number of hash value matches for the set of depth offset deltas.

13. A non-transitory computer readable medium storing a set of well log channels and a set of contexts linked to the set of well log channels, wherein the set of well log channels further comprises an unknown well log channel for which a link to a corresponding context is missing, and wherein the non-transitory computer readable storage medium further comprises instructions that, when executed by a computer processor, perform operations comprising:
calculating a first set of hash values for the set of well log channels, wherein calculating comprises:
transforming the set of well log channels into a spectrogram structure stored in the non-transitory computer readable storage medium, wherein the spectrogram structure comprises an anchor point paired with a plurality of target points, and
generating the first set of hash values using the anchor point and the plurality of target points;
extracting a well log channel snippet from the unknown well log channel;
calculating, using a second anchor point and a second plurality of target points of the unknown well log channel within the snippet, a second set of hash values;
identifying, for the unknown well log channel, a matching well log channel by searching the first set of hash values with the second set of hash values; and storing in the non-transitory computer readable storage medium, for the unknown well log channel, a channel context corresponding to the matching well log channel as the corresponding context.

14. The non-transitory computer readable medium of claim 13,
wherein the anchor point comprises an anchor depth and an anchor frequency,
wherein the set of target points comprises a target point comprising a target depth and a target frequency, and
wherein a subset of the first set of hash values is calculated using the anchor frequency of the anchor point in a respective anchor/target pair, the target frequency of the target point in the respective anchor/target pair, and the difference between the anchor depth of the anchor point in the respective anchor/target pair and the target depth of the target point in the respective anchor/target pair.

15. The non-transitory computer readable medium of claim 13, wherein the instructions further perform operations comprising:
pairing the anchor point with the plurality of target points to obtain a set of anchor/target pairs,
wherein a subset of the second set of hash values is calculated using the set of anchor/target pairs.

16. The non-transitory computer readable medium of claim 13, wherein the instructions further perform operations comprising:

associating, with the first set of hash values, a first set of depth offsets relative to the set of well log channels; and
associating, with the second set of hash values, a second set of depth offsets relative to the well log channel snippet.

17. The non-transitory computer readable medium of claim 16, wherein the instructions further perform operations comprising:
identifying a set of hash value matches comprising a hash value of the first set of hash values and a hash value of the second set of hash values;
calculating, for the set of well log channels, a set of depth offset deltas using the depth offsets associated with the hash values in the respective hash value match of the set of hash value matches;
calculating a number of hash value matches for the respective depth offset delta of the set of depth offset deltas; and
scoring the set of well log channels using the number of hash value matches for the set of depth offset deltas.

18. The non-transitory computer readable storage medium of claim 17, wherein the instructions further perform operations comprising:
scoring the set of well log channels using the number of hash value matches for the set of depth offset deltas.

* * * * *